United States Patent
Cogswell et al.

(10) Patent No.: US 10,386,100 B2
(45) Date of Patent: Aug. 20, 2019

(54) ADSORPTION SYSTEM HEAT EXCHANGER

(71) Applicant: Carrier Corporation, Farmington, CT (US)

(72) Inventors: Frederick J. Cogswell, Glastonbury, CT (US); Parmesh Verma, South Windsor, CT (US); Catherine Thibaud, South Windsor, CT (US); Bart A. Van Hassel, Weatogue, CT (US); Thomas D. Radcliff, Vernon, CT (US); Subramanyaravi Annapragada, Shrewsbury, MA (US); Abdelrahman ElSherbini, Windsor, CT (US)

(73) Assignee: CARRIER CORPORATION, Farmington, CT (US)

( * ) Notice: Subject to any disclaimer, the term of this patent is extended or adjusted under 35 U.S.C. 154(b) by 662 days.

(21) Appl. No.: 14/851,096

(22) Filed: Sep. 11, 2015

(65) Prior Publication Data

US 2016/0131400 A1     May 12, 2016

Related U.S. Application Data

(60) Provisional application No. 62/078,747, filed on Nov. 12, 2014.

(51) Int. Cl.
    *F25B 37/00*      (2006.01)
    *F28D 20/00*      (2006.01)
    *F25B 17/08*      (2006.01)

(52) U.S. Cl.
CPC .......... *F25B 37/00* (2013.01); *F28D 20/003* (2013.01); *F25B 17/083* (2013.01); *Y02A 30/278* (2018.01); *Y02B 30/64* (2013.01); *Y02E 60/142* (2013.01)

(58) Field of Classification Search
CPC ........ F25B 35/04; F25B 17/08; F25B 17/083; F28D 20/003; F28F 13/003; F24F 3/1411; F24F 3/1429
USPC ..................................... 62/476–497
See application file for complete search history.

(56) References Cited

U.S. PATENT DOCUMENTS

| | | | |
|---|---|---|---|
| 2,466,541 A * | 4/1949 | Gaugler | F25B 33/00 261/100 |
| 4,029,483 A | 6/1977 | Long | |
| 5,281,254 A | 1/1994 | Birbara et al. | |
| 5,732,569 A | 3/1998 | Sanada et al. | |
| 6,102,107 A | 8/2000 | Dunne | |
| 6,314,752 B1 * | 11/2001 | Christensen | F25B 15/00 62/484 |
| 6,601,404 B1 | 8/2003 | Roderick | |
| 6,672,103 B1 * | 1/2004 | Stach | F28D 20/003 62/480 |
| 6,973,963 B2 | 12/2005 | Dunne et al. | |

(Continued)

FOREIGN PATENT DOCUMENTS

| | | |
|---|---|---|
| DE | 19522250 A1 | 1/1997 |
| DE | 10119258 A1 | 10/2001 |

(Continued)

*Primary Examiner* — Filip Zec
(74) *Attorney, Agent, or Firm* — Cantor Colburn LLP

(57) ABSTRACT

In one aspect, a heat exchanger layer for an adsorption bed heat exchanger assembly is provided. The heat exchanger layer includes at least one fluid tube configured to supply a heat transfer fluid, a sorbent containment structure having a plurality of compartments, and a sorbent disposed within the plurality of compartments.

14 Claims, 3 Drawing Sheets

(56) References Cited

U.S. PATENT DOCUMENTS

| | | | |
|---|---|---|---|
| 7,066,241 B2 * | 6/2006 | Garimella | F25B 37/00 165/116 |
| 7,704,305 B2 * | 4/2010 | Nishida | B01D 53/261 96/154 |
| 8,276,393 B2 | 10/2012 | Critoph | |
| 8,322,408 B2 | 12/2012 | Yoshioka et al. | |
| 8,702,851 B2 | 4/2014 | O'Coin | |
| 8,707,729 B2 | 4/2014 | Schmidt et al. | |
| 8,770,267 B2 * | 7/2014 | Nagashima | B22F 3/11 165/104.34 |
| 9,440,513 B2 * | 9/2016 | Boudard | B60H 1/00342 |
| 2002/0017380 A1 * | 2/2002 | Jonsson | C09K 5/16 165/104.12 |
| 2005/0061483 A1 * | 3/2005 | Dunne | F25B 35/04 165/104.12 |
| 2011/0247494 A1 | 10/2011 | Dinnage et al. | |
| 2012/0272671 A1 | 11/2012 | Mills | |

FOREIGN PATENT DOCUMENTS

| | | |
|---|---|---|
| GB | 2029257 A | 3/1980 |
| WO | 2004033097 A1 | 4/2004 |

* cited by examiner

ADSORPTION SYSTEM HEAT EXCHANGER

This invention was made with government support under contract number DE-AR0000183 awarded by the Department of Energy. The government has certain rights in the invention.

FIELD OF THE INVENTION

The subject matter disclosed herein relates to heat exchangers and, more specifically, to adsorption based heat exchangers.

BACKGROUND

Sorption cooling processes typically employ an adsorbent disposed in a metal vessel contained on a metal screen or surface which provides support for the adsorbent and permits the adsorbent to be placed in contact with a fluid stream containing an adsorbable component over the range of conditions necessary for adsorption and desorption.

In operation of sorption cooling systems, one or more solid beds containing a solid adsorbent are provided. The solid adsorbent beds desorb refrigerant when heated and adsorb refrigerant vapor when cooled. In this manner, the beds can be used to drive refrigerant around a heat pump system to heat or cool another fluid such as a process stream or to provide space heating or cooling. If two or more beds are used, the process may be continuous as at least one of the beds is heated to desorb refrigerant while another is cooled as it adsorbs the refrigerant. If a single bed is used, the desorbed refrigerant must be stored in a receiver before later being readsorbed later by the same bed.

In a single bed configuration, refrigerant is desorbed from the bed as it is heated to drive the refrigerant out, and the refrigerant vapor is conveyed to a condenser where it is cooled and condensed to a liquid. The liquid is stored in a receiver until it is needed for the adsorption process.

In some systems, the adsorption/desorption process requires that there be a difference between the actual vapor pressure of the refrigerant and the equilibrium vapor pressure of the refrigerant/sorbent compound. The adsorption/desorption process may be rate-limited by two transfer processes. First, the refrigerant must be able to freely move from the adsorber headers to the sorbent molecules. Second, the heat of adsorption/desorption must be quickly removed from the sorbent. If during adsorption, for example, the heat is not removed the sorbent heats and the equilibrium refrigerant vapor pressure is raised, thus stopping or reducing the adsorption process.

Further, the solid sorbent expands during adsorption and shrinks during desorption. This prevents tight packing of the sorbent into the bed, and may result in void formation between the sorbent and metal heat exchanger. One resistance to heat transfer is contact of the sorbent to the heat exchanger fins.

BRIEF DESCRIPTION OF THE INVENTION

In one aspect, a heat exchanger layer for an adsorption bed heat exchanger assembly is provided. The heat exchanger layer includes at least one fluid tube configured to supply a heat transfer fluid, a sorbent containment structure having a plurality of compartments, and a sorbent disposed within the plurality of compartments.

In addition to one or more of the features described above, or as an alternative, further embodiments include wherein the at least one fluid tube is a plurality of tubes fluidly coupled between the first and second headers, and wherein a plurality of fins coupled between adjacent tubes of the plurality of tubes, wherein the plurality of fins and the plurality of tubes define sorbent containment structure having the plurality of compartments; a first header disposed at a first end, and a second header disposed at a second end, the plurality of tubes fluidly coupled between the first and second headers; a first fine screen and a second fine screen disposed adjacent the plurality of compartments; a first coarse screen and a second coarse screen disposed adjacent the first and second fine screens, respectively; wherein the plurality of tubes comprises a plurality of flat tubes; wherein each flat tube of the plurality of flat tubes has a substantially rectangular cross-section; wherein at least one flat tube of the plurality of flat tubes comprises a plurality of ports extending therethrough configured to receive a refrigerant; and/or wherein the sorbent containment structure is a first honeycomb layer and a second honeycomb layer disposed on either side of the at least one fluid tube.

In another aspect, an adsorption bed heat exchanger assembly is provided. The assembly includes a pressure vessel and a plurality of heat exchanger layers disposed within the pressure vessel. Each heat exchanger layer of the plurality of heat exchanger layers includes at least one fluid tube configured to supply a heat transfer fluid, a sorbent containment structure having a plurality of compartments, and a sorbent disposed within the plurality of compartments.

In addition to one or more of the features described above, or as an alternative, further embodiments include wherein each heat exchanger layer of the plurality of heat exchanger layers is rectangular; a first fine screen and a second fine screen disposed adjacent the plurality of compartments; a first coarse screen and a second coarse screen disposed adjacent the first and second fine screens, respectively; wherein the plurality of tubes comprises a plurality of flat tubes; wherein each flat tube of the plurality of flat tubes has a substantially rectangular cross-section; wherein at least one flat tube of the plurality of flat tubes comprises a plurality of ports extending therethrough configured to receive a refrigerant; wherein the at least one fluid tube is a plurality of tubes fluidly coupled between the first and second headers, and wherein a plurality of fins coupled between adjacent tubes of the plurality of tubes, wherein the plurality of fins and the plurality of tubes define sorbent containment structure having the plurality of compartments; and/or wherein the sorbent containment structure is a first honeycomb layer and a second honeycomb layer disposed on either side of the at least one fluid tube.

In yet another aspect, a method of assembling an adsorption bed heat exchanger assembly is provided. The method includes providing a pressure vessel, and disposing a plurality of heat exchanger layers into the pressure vessel. Each heat exchanger layer of the plurality of heat exchanger layers includes at least one fluid tube configured to supply a heat transfer fluid, a sorbent containment structure having a plurality of compartments, and a sorbent disposed within the plurality of compartments. The method further includes disposing a sorbent within the plurality of compartments.

In addition to one or more of the features described above, or as an alternative, further embodiments include disposing a first fine screen and a second fine screen adjacent the plurality of compartments, and disposing a first coarse screen and a second coarse screen adjacent the first and second fine screens, respectively.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
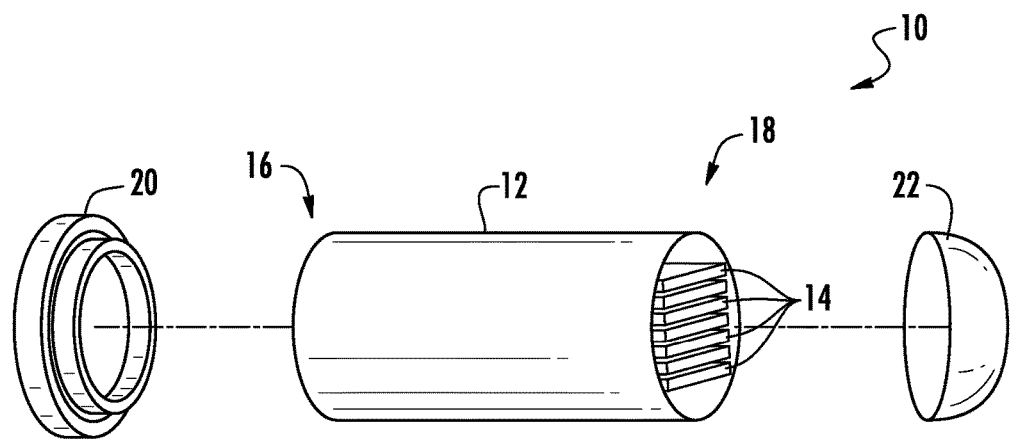
FIG. 1 is an exploded view of an exemplary adsorption bed heat exchanger assembly.

FIG. 1 illustrates an exemplary adsorption bed heat exchanger assembly 10 that generally includes a pressure vessel 12 housing a plurality of microchannel heat exchanger layers 14. Pressure vessel 12 is cylindrical or substantially cylindrical and includes a first end 16 and an opposite second end 18. First end 16 is coupled to an end seal 20, which facilitates passage of first and second fluids (e.g., heat transfer fluids, refrigerants) therethrough, and second end 18 is hermetically sealed with an end cap 22. Alternatively, first and second fluids may be supplied through separate ends 16, 18 or both through second end 18.

Figure 2:
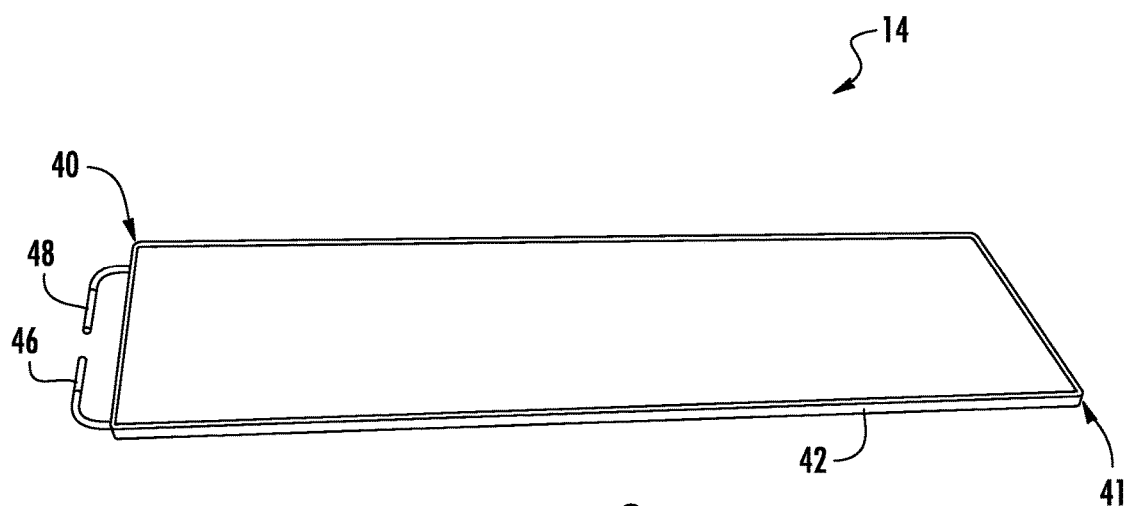
FIG. 2 is an exemplary heat exchanger layer that may be used in the assembly shown in FIG. 1.
Figure 3:
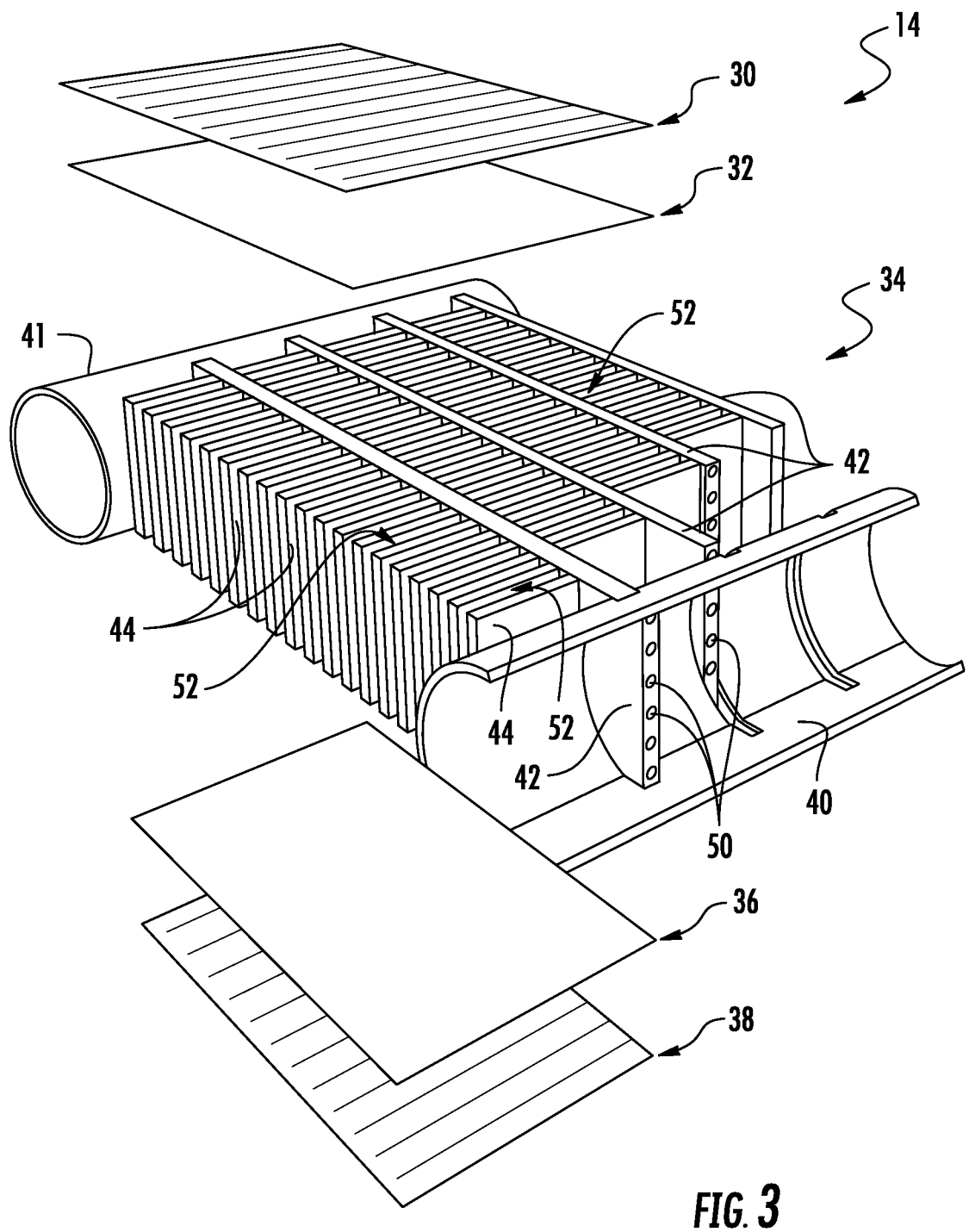
FIG. 3 is an exploded view of the heat exchanger layer shown in FIG. 2.

With reference to FIGS. 2 and 3, each heat exchanger layer 14 generally includes a top coarse screen 30, a top fine screen 32, a tube and fin assembly 34, a bottom fine screen 36, and a bottom coarse screen 38. Coarse screens 30, 38 are configured to respectively provide structure and rigidity to fine screens 32, 36, which contain an adsorbent within the tube and fin assembly 34. When multiple layers 14 are stacked, coarse screens 30, 38 also provide a low-resistance path for the vaporous second fluid to flow through between layers so that it can reach a sorbent disposed in assembly 34.

In the exemplary embodiment, tube and fin assembly 34 generally includes opposed headers 40, 41, flat tubes 42, and heat exchanging fins 44. As shown in FIG. 2, header 40 includes an inlet 46 and an outlet 48 to circulate the first fluid into assembly 10. In the exemplary embodiment, the first fluid is utilized as a cooling/heating source depending on whether heat exchanger assembly 10 is operating in an adsorbing mode or a desorbing mode. Headers 40, 41 are fluidly coupled to flat tubes 42 for circulation of the first fluid therein. In the exemplary embodiment, the first fluid is a coolant fluid such as water from a cooling circuit of an engine or generator. However, first refrigerant may be any suitable coolant or refrigerant that enables assembly 10 to function as described herein. Although described utilizing headers 40, 41, heat exchanger assembly 10 may utilize any suitable fluid delivery system to supply to and circulate fluid within assembly 10.

As shown in FIG. 3, flat tubes 42 have a generally rectangular cross-section and include a plurality of ports 50 to supply the first fluid through flat tubes 42 and throughout each heat exchanger layer 14. Fins 44 are coupled between adjacent flat tubes 42 and are oriented perpendicularly to or substantially perpendicularly to flat tubes 42. As such, adjacent flat tubes 42 and fins 44 define a plurality of compartments 52 configured to receive a sorbent material therein. Compartments 52 are also defined between fins 44 and headers 40, 41.

In the exemplary embodiment, the sorbent material is BaCl2. However, the sorbent material may be any suitable sorbent material that enables assembly 10 to function as described herein. For example, the sorbent material may be zeolite or silica.

The sorbent contained within compartments 52 is bounded directly by adjacent fins 44 (or fin 44 and header 40, 41) and adjacent flat tubes 42, which provides increased heat exchange between the sorbent and the first fluid flowing through flat tubes 42. The sorbent within compartments 52 is bounded on the top and bottom by fine screens 32, 36.

Vaporous second fluid is supplied through end seal 20 into pressure vessel 12 for dispersal through heat exchanger layers 14. The second fluid may be adsorbed into the adsorbent for storage, and subsequently released through a desorption process. In the exemplary embodiment, the second fluid is ammonia refrigerant and may be utilized to provide cooling to additional components or structure. However, the second fluid may be any suitable coolant or refrigerant that provides thermal conditioning to another system or component.

In operation, adsorption bed heat exchanger 10 may be operated between an adsorption mode and a desorption mode. In the adsorption mode, vaporous second fluid is supplied from an evaporator (not shown) through end seal 20 and into pressure vessel 12. The vaporous fluid is supplied through heat exchanger layers 14 and into individual compartments 52 where the sorbent adsorbs the fluid.

Cooled first fluid is supplied through headers 40, 41 and flat tubes 42, which are in thermal contact with fins 44 and the sorbent. Heat generated by the adsorption process is transferred through fins 44 and flat tubes 42 to the first fluid, which is removed via header outlet 48 for further cooling.

When adsorption bed 10 is saturated with second fluid or a desired amount of second fluid has been stored, the bed may be switched to operate in the desorption mode. To facilitate desorption, heated first fluid is supplied through headers 40, 41 and flat tubes 42, which are in thermal contact with fins 44 and the sorbent storing the second fluid. The heated sorbent releases the stored second fluid, and the refrigerant vapor is subsequently supplied to a condenser and evaporator for cooling of another system or component.

A method of fabricating adsorption bed heat exchanger assembly 10 includes providing coarse screens 30, 38, fine screens 32, 36, and tube and fin assembly 34. Flat tubes 42 are fluidly coupled between headers 40, 41 and fins 44 are coupled between adjacent flat tubes 42 to define compartments 52. In one embodiment, fins 44 are brazed between tubes 42. However, fins 44 may be coupled to tubes 42 in any suitable manner.

Sorbent is disposed within compartments 52, and fine screens 32, 36 are disposed on either side of tube and fin assembly 34 to contain the sorbent within compartments 52. For example, fine screen 36 may be disposed on one side of assembly 34, sorbent may be disposed within compartments 52, and then fine screen 32 may be disposed on the other side of assembly 34. Coarse screens 30, 38 may then be disposed over fine screens 32, 36. Heat exchanger layers 14 may then be inserted into pressure vessel 14, and end seal 20 and end cap 22 may be coupled to pressure vessel 12.

Figure 4:
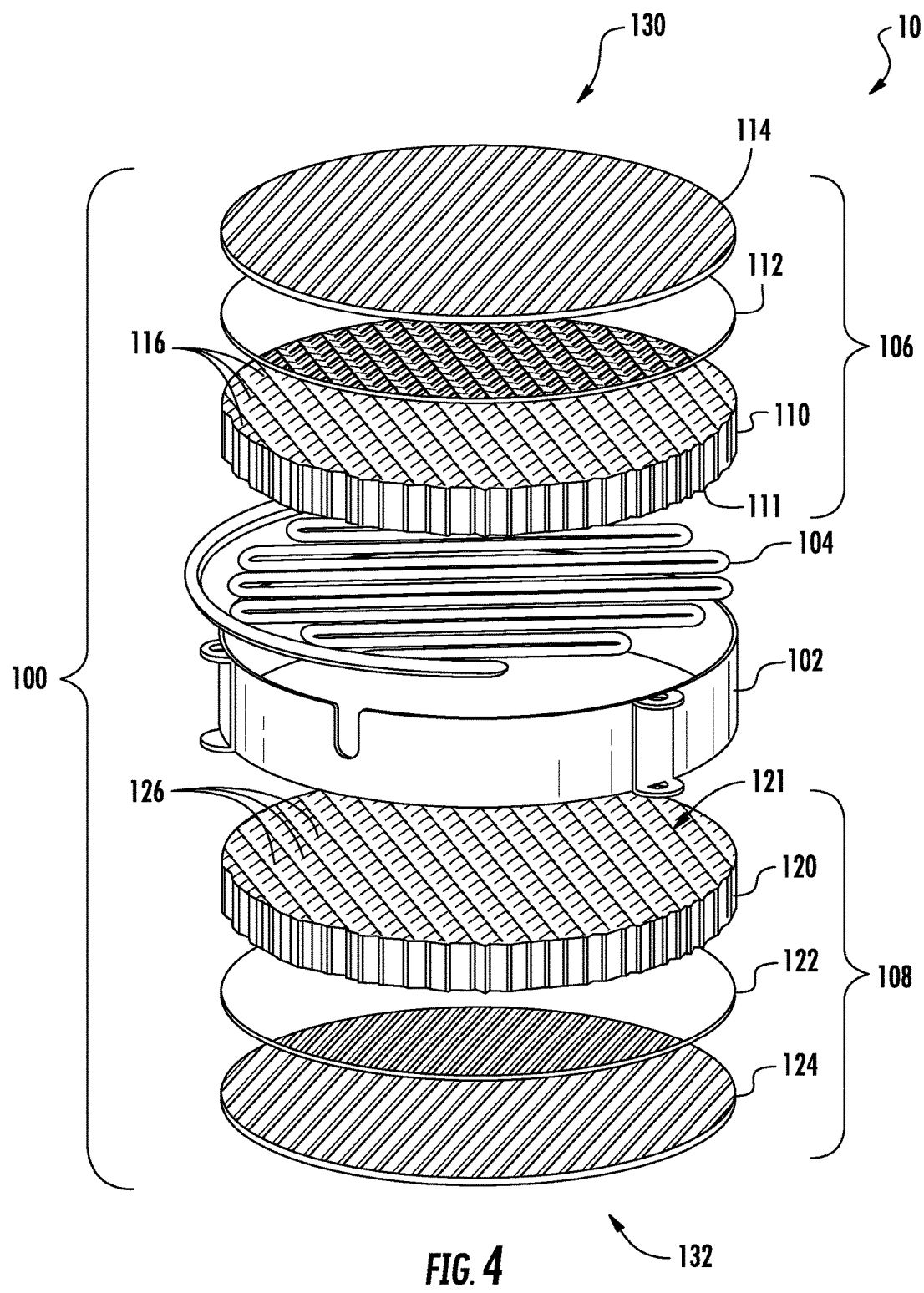
FIG. 4 illustrates another exemplary adsorption bed heat exchanger assembly.

FIG. 4 illustrates an alternate embodiment of adsorption bed heat exchanger assembly 10 that generally includes one or more cassettes 100 arranged in a pressure vessel (not shown). Although one cassette 100 is illustrated, assembly 10 may have any number of cassettes 100 operably connected to each other to provide a desired heat exchange capacity.

Cassette 100 generally includes a cylindrical or generally cylindrical housing or support ring 102. A serpentine heat transfer fluid tube 104 is disposed within support ring 102 and is bounded on either side by a first heat exchange layer 106 and a second heat exchange layer 108.

First heat exchange layer 106 includes an upper honeycomb layer 110, an upper fine mesh screen 112, and an upper coarse screen 114. Upper coarse screen 114 is configured to provide structure and rigidity to upper fine screen 112, which contains an adsorbent within a plurality of pockets or compartments 116 formed in honeycomb layer 110. Coarse screen 114 also provides a low-resistance path for the vaporous second fluid to flow between layers to reach compartments 116. In the exemplary embodiment, honeycomb layer 110 includes a heat exchange plate 111 configured to be disposed in thermal contact with fluid tube 104, for example, by brazing plate 111 and fluid tube 104. The sorbent contained within compartments 116 is bounded directly by adjacent plate 11 and adjacent upper fine screen 112, which provides increased heat exchange between the sorbent and a heat transfer fluid flowing through fluid tube 104. In one embodiment, fluid tube 104 is thermally coupled to an engine radiator or a refrigeration circuit. However, fluid tube 104 may be thermally coupled to any suitable component or structure for thermal exchange therewith.

Second heat exchange layer 108 includes a lower honeycomb layer 120, a lower fine mesh screen 122, and a lower coarse screen 124. Lower coarse screen 124 is configured to provide structure and rigidity to lower fine screen 122, which contains an adsorbent within a plurality of pockets or compartments 126 formed in honeycomb layer 120. In the exemplary embodiment, honeycomb layer 120 includes a heat exchange plate 121 configured to be disposed against fluid tube 104. The sorbent contained within compartments 126 is bounded directly by adjacent plate 121 and adjacent lower fine screen 122, which provides increased heat exchange between the sorbent and the heat transfer fluid flowing through fluid tube 104.

A vaporous second fluid is supplied through cassette ends 130 and 132 and into respective first heat exchange structure 106 and second heat exchange structure 108. The second fluid may be adsorbed into the adsorbent for storage, and subsequently released through a desorption process. In the exemplary embodiment, the second fluid is ammonia refrigerant and may be utilized to provide cooling to additional components or structure. However, the second fluid may be any suitable coolant or refrigerant that provides thermal conditioning to another system or component.

In operation, adsorption bed heat exchanger assembly 10 having cassette 100 may be operated between an adsorption mode and a desorption mode. In the adsorption mode, vaporous second fluid is supplied form an evaporator (not shown) through cassette ends 130, 132. The vaporous fluid is supplied through heat exchange layers 106, 108 and into individual compartments 116, 126 where the sorbent adsorbs the fluid.

Cooled first fluid is supplied through tube 104, which is in thermal contact with honeycomb layers 110, 120 and the sorbent. Heat generated by the adsorption process is transferred through tube 104 to the first fluid, which is removed for further cooling When cassette 100 is saturated with second fluid or a desired amount of second fluid has been stored, the bed may be switched to operate in the desorption mode. To facilitate desorption, heated first fluid is supplied through tube 104, which is in thermal contact with honeycomb layers 110, 120 and the sorbent storing the second fluid. The heated sorbent releases the stored second fluid, and the refrigerant vapor is subsequently supplied to a condenser and evaporator for cooling of another system or component.

A alternative method of fabricating adsorption bed heat exchanger assembly 10 includes providing cassette 100 with first heat exchanger layer 106 and second heat exchanger layer 108. First layer 106 includes honeycomb layer 110, upper fine screen 112, and upper coarse screen 114. Second layer 108 includes honeycomb layer 120, lower fine screen 122, and lower coarse screen 124. Honeycomb layers 110, 120 are disposed in support ring 102 on either side of fluid tube 104. Sorbent is disposed within compartments 116 and 126 of respective honeycomb layers 110 and 120. Fine screens 112 and 122 may then be disposed over respective honeycomb layers 110 and 120. Coarse screens 114 and 124 may then be disposed over respective fine screens 112 and 122. Alternatively, first and second heat exchanger layers 106, 108 may be assembled with sorbent and then disposed within support ring 102.

Described herein are systems and methods for adsorption bed heat exchanger assemblies. The assemblies provide porous unobstructed transport of the refrigerant throughout the bed, while also providing good heat transfer from the sorbent to the secondary fluid. The assemblies also provide large sorbent to metal surface area for given sorbent volume, high fin effectiveness for heat transfer between the sorbent and secondary fluid tubes, minimal obstruction to refrigerant flow past the tube/fin structures, and compliance in the structure allowing the sorbent to expand.

The invention described herein provides unique features. Firstly, many small compartments are provided to hold the sorbent in which the sorbent is loosely packed. This allows the sorbent to expand and move during the adsorption process without damaging the metal structure while preventing shifting or clumping of the power. Secondly, the boundaries of each compartment act as highly efficient fins which convey heat to and from the secondary fluid tubes. Thirdly, the secondary fluid tubes penetrate throughout the bed providing good thermal contact to the fins, and fourthly, screens are used on one or more sides of the compartments to contain the sorbent while allowing free flow of the refrigerant into and out of the sorbent.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat exchanger layer for an adsorption bed heat exchanger assembly, the heat exchanger layer comprising:
   at least one fluid tube configured to supply a heat transfer fluid;
   a first sorbent containment structure having a plurality of compartments;
   a second sorbent containment structure having a plurality of compartments;
   a sorbent disposed within the plurality of compartments;
   a first fine screen and a second fine screen disposed adjacent the plurality of compartments and a first coarse screen and a second coarse screen disposed adjacent the first and second fine screens, respectively;

wherein the first coarse screen, the first fine screen, the first sorbent containment structure, the at least one fluid tube, the second sorbent containment structure, the second fine screen and the second coarse screen are arranged in sequence in a stacked relationship.

2. The heat exchanger layer of claim 1, wherein the at least one fluid tube is a plurality of tubes fluidly coupled between the first and second headers, and wherein a plurality of fins coupled between adjacent tubes of the plurality of tubes, wherein the plurality of fins and the plurality of tubes define sorbent containment structure having the plurality of compartments.

3. The heat exchanger layer of claim 2, further comprising: a first header disposed at a first end; and
a second header disposed at a second end, the plurality of tubes fluidly coupled between the first and second headers.

4. The heat exchanger layer of claim 2, wherein the plurality of tubes comprises a plurality of flat tubes.

5. The heat exchanger layer of claim 4, wherein each flat tube of the plurality of flat tubes has a substantially rectangular cross-section.

6. The heat exchanger layer of claim 4, wherein at least one flat tube of the plurality of flat tubes comprises a plurality of ports extending therethrough configured to receive a refrigerant.

7. The heat exchanger layer of claim 1, wherein the sorbent containment structure is a first honeycomb layer and a second honeycomb layer disposed on either side of the at least one fluid tube.

8. An adsorption bed heat exchanger assembly comprising:
a pressure vessel; and
a plurality of heat exchanger layers disposed within the pressure vessel, wherein each heat exchanger layer of the plurality of heat exchanger layers comprises:
at least one fluid tube configured to supply a heat transfer fluid;
a first sorbent containment structure having a plurality of compartments;
a second sorbent containment structure having a plurality of compartments;
a sorbent disposed within the plurality of compartments;
a first fine screen and a second fine screen disposed adjacent the plurality of compartments and a first coarse screen and a second coarse screen disposed adjacent the first and second fine screens, respectively;
wherein the first coarse screen, the first fine screen, the first sorbent containment structure, the at least one fluid tube, the second sorbent containment structure, the second fine screen and the second coarse screen are arranged in sequence in a stacked relationship.

9. The assembly of claim 8, wherein each heat exchanger layer of the plurality of heat exchanger layers is rectangular.

10. The assembly of claim 8, wherein the plurality of tubes comprises a plurality of flat tubes.

11. The assembly of claim 10, wherein each flat tube of the plurality of flat tubes has a substantially rectangular cross-section.

12. The assembly of claim 10, wherein at least one flat tube of the plurality of flat tubes comprises a plurality of ports extending therethrough configured to receive a refrigerant.

13. The assembly of claim 8, wherein the at least one fluid tube is a plurality of tubes fluidly coupled between the first and second headers, and wherein a plurality of fins coupled between adjacent tubes of the plurality of tubes, wherein the plurality of fins and the plurality of tubes define sorbent containment structure having the plurality of compartments.

14. The assembly of claim 8, wherein the sorbent containment structure is a first honeycomb layer and a second honeycomb layer disposed on either side of the at least one fluid tube.

* * * * *